UNITED STATES PATENT OFFICE.

THEODORE C. FULLER, OF PAWTUCKET, RHODE ISLAND.

ALTERATIVE TONIC.

SPECIFICATION forming part of Letters Patent No. 403,185, dated May 14, 1889.

Application filed January 21, 1889. Serial No. 297,044. (No specimens.)

*To all whom it may concern:*

Be it known that I, THEODORE C. FULLER, a citizen of the United States, residing at Pawtucket, in the county of Providence and State of Rhode Island, have invented a new and useful composition of matter to be used in any cases of stomach difficulty or any illness connected therewith, of which the following is a specification.

My composition consists of the following ingredients, combined in the proportions stated, viz: Prince's-pine leaves, (*Chimaphila umbellata,*) one-half pound; buckthorn-berries, American,(*Rhamnus catharticus,*)two ounces; checkerberry leaves and stem, (*Gaultheria procumbens,*) two ounces; yellow-dock root, (*Rumex crispus,*) two ounces; burdock-root, (*Arctium lappa,*) two ounces; sarsaparilla-root, American, (*Aralia nudicaulis,*) four ounces; wild-cherry bark, (*Prunus "cerasus" Virginiana,*) two ounces; green of alder-bark, (*Sambucus Canadensis,*) four ounces; bay-bush leaves or sweet bay, (*Myrica gale,*) two ounces; bloodwort, male plant, leaves or roots, if not too large, (*Hieracium venosum,*) two ounces. These ingredients, after being thoroughly mixed together, are placed in a vessel containing a small amount of water and steeped for about six hours over a slow fire. When the mixture has been thoroughly steeped, as described, I add one gallon of water. To each quart of the sirup thus formed I add one gill of alcohol. The color of the liquor thus made should be a dark red.

The manner of using this mixture is to take one-half a wine-glassful after each meal.

What I claim, and desire to secure by Letters Patent of the United States, is—

The herein-described composition of matter to be used for stomach difficulties and illness of like nature, consisting of Prince's pine, (*Chimaphila,*) buckthorn-berries, checkerberry (*Gaultheria*) leaves, yellow-dock root, burdock-root, sarsaparilla-root, wild-cherry bark, green of alder, bay-bush leaves, bloodwort, water, and alcohol, in the proportions specified.

THEODORE C. FULLER.

In presence of—
EDWARD W. BLODGETT,
W. W. BLODGETT.